0
United States Patent Office 3,169,139
Patented Feb. 9, 1965

3,169,139
HYDROXYLATION PROCESS FOR OLEFINIC HIGHER FATTY ACID AND FATTY ACID ESTER
Alfred A. D'Addieco, Grand Island, N.Y., assignor to E. I. du Pont de Nemours and Company, Wilmington, Del., a corporation of Delaware
No Drawing. Filed Jan. 20, 1960, Ser. No. 3,488
7 Claims. (Cl. 260—406)

This invention relates to an improved method for carrying out oxidation reactions with hydrogen peroxide, particularly hydroxylation reactions involving olefinically unsaturated compounds.

This application is a continuation-in-part of my application Serial No. 471,875, filed November 29, 1954, which is a continuation of Serial No. 396,307, filed December 4, 1953, both now abandoned.

Hydrogen peroxide has been used as an oxidizing agent in reactions involving a large variety of olefinically unsaturated compounds. Perhaps the most important of such reactions are those involving the hydroxylation or epoxidation of such compounds. The hydroxylation reactions are usually effected in an excess of an organic acid and in the presence of a strong, soluble mineral acid. Frequently hydroxylation preparation results in the formation of undesirable by-products with accompanying low yields of the polyhydroxy compounds. The present invention provides a commercially applicable process which results in high yields of the desired hydroxylated products.

Recent developments in effecting oxidation reactions with hydrogen peroxide have led to the use of solid resin catalysis. Epoxidation has been carried out with virtual exclusion of by-products, such as hydroxylated products, using polystyrene sulfonic acid exchange resins of medium or low porosity. High yields of hydroxylated products to the virtual exclusion of by-products, such as epoxides and ethers, can be effected using a lower aliphatic acid, hydrogen peroxide and a sulfonated monovinyl aromatic exchange resin of high porosity. In the hydroxylation of higher fatty esters, the ester linkage remains intact unlike other hydroxylation procedures.

It is an object of the present invention to provide an improved hydroxylation process for olefinically unsaturated compounds using a solid catalyst.

It is another object of the present invention to provide a single-step hydroxylation process using an exchange resin of high porosity.

It is still another object of the present invention to provide a process for hydroxylating a higher fatty acid ester without rupturing the ester linkage.

These and other objects will be apparent from the following description.

It is generally known that a wide variety of olefinically unsaturated compounds can be hydroxylated by reactions with peraliphatic acids. Compounds well known to undergo hydroxylation reactions include olefinic hydrocarbons such as the amylenes, the hexylenes, the tetradecenes and the octadecenes; olefinic fatty acids such as oleic, ricinoleic, undecylenic and erucic acids; nitriles, amides and esters of such acids, including their esters with mono-, di- and tri-hydric alcohols, such as methyl oleate, methyl ricinoleate, diethylene glycol dioleate, glycerol monooleate, glycerol trioleate, soybean oil, castor oil, olive oil, tall oil, peanut oil and cotton seed oil; olefinic alcohols such as the decanols, the tetradecenols, the hexadecenols and oleyl alcohol; and derivatives of such alcohols, e.g., oleyl acetate, oleyl oleate and the like.

The olefinically unsaturated compounds generally hydroxylated for commercial purposes are those whose structures contain at least five carbon atoms and at least one olefinic double bond. Generally, the materials hydroxylated are animal fats and vegetable oils, especially esters of fatty acids and these, therefore, constitute a preferred group of reactants.

Fatty acids and esters thereof having at least one double bond which can be hydroxylated to 60–80% according to the present invention (based on double bonds removed) are those which have five or more carbon atoms, such as tall oils and soybean oil. Specifically methyl oleate, 2-ethylhexyl tallate and N-butyl tallate are hydroxylated to more than 60%. The hydroxylated products are useful in a variety of applications, such as emulsifiers, greases and plasticizers. Lecithin containing oleic, stearic, palmitic and other fatty acids can be hydroxylated to a useful emulsifier in the manufacture of candies.

According to the process of the present invention the hydroxylation of olefinic linkages to form di-hydroxy compounds is catalyzed by a cation exchange resin in the hydrogen form. These resins are sulfonated copolymers of comparatively little cross-linking having 1–6% of polyvinyl aromatic hydrocarbon. Preferred resins are sulfonated copolymers of mixtures of a monovinyl benzene such as styrene with about 4% of a polyvinyl benzene such as divinyl benzene. Such products as "Dowex" 50–X–4 and "Amberlite" XE–100 are commercial examples of these resins. These resins are of the sulfonic acid type in which the active sulfonic acid groups are attached directly to an aromatic ring of a hydrocarbon resin structure and are active catalysts; they are stable under reaction conditions and remain insoluble during extended use.

The cation-exchange resins will usually be employed in granular or bead form and should be present in the reaction mixture in an amount sufficient to catalyze the overall reaction at a practical rate. Particle size of the resin does not appear to be critical, commercially available sizes ranging from about 20 to 200 mesh being generally suitable. A worth-while effect will usually result from the use of as little as 0.5% of the resin based upon the total weight of the reactants. The preferred amounts, particularly when the reaction is carried out batchwise are usually in two ranges: from about 1 to 4% and from about 10 to 50%, but much larger amounts can be used. The lower range is used to facilitate filtration in the work up of the product and to allow discard of the resin catalyst at the end of each reaction. The operations can be carried out continuously, e.g., by passing a mixture of the reactants through a column of the cation-exchange resin. In such cases, the resin content of the reaction mixture at any given instant may be quite high, e.g., upwards of 100% or more based on the weight of the reactants.

The method of the invention can be practiced at temperatures over a wide range, the optimum temperature in any give case depending upon several factors including the particular reaction involved, the particular resin catalyst used, and the stability of the product under the reaction conditions to be employed. Hydroxylation is carried out at a temperature within the range of about 40° to 90° C. or more, the preferred range being 60° to 80° C., depending on the reaction time.

The hydrogen peroxide reactant can be supplied conveniently as an aqueous solution. Aqueous solutions containing at least 25% $H_2O_2$ by weight will generally be used. Commercial 35%, 50% and 70% solutions are suitable and solutions containing around 35% or more $H_2O_2$ are preferred. Hydrogen peroxide equivalent to around 0.9 to 1.1 moles of $H_2O_2$ for each oxidizable olefinic linkage in the molecule of the compound being hydroxylated will most generally be used. Larger or smaller amounts can be employed depending upon the results desired.

In the preferred embodiment of the invention an aliphatic acid is also added to the reaction mixture and substantial benefit can be achieved by the addition to the mixture of as little as 0.01 mole of a lower aliphatic acid per mole of hydrogen peroxide employed. Preferably, between about 0.2 to 1.0 mole of the acid per mole of hydrogen peroxide will be added. Much larger quantities, e.g., up to ten moles or more, can be used but are best avoided because of the costly recovery problem imposed. Aliphatic acids having 1 to 5 carbon atoms are suitable; acetic acid is preferred, although formic, butyric and propionic acids can also be used.

Hydroxylation can be carried out in ten or more minutes up to several hours depending on the reaction temperature. If the reaction is carried out for more than ten hours at about 80° C. or above, appreciable amounts of polyethers are formed. If the reaction temperature is about 60° C., significant polyether formation occurs only after 24 hours or longer. In general, reaction times of more than ten hours should be avoided when the temperature is about 80° C. or above.

Example 1

A mixture of 29.2 grams (0.10 mole) of technical methyl oleate (iodine number 87.1), 7.5 grams of resin (sulfonated copolymer of styrene and 4% divinyl benzene-4% cross-linkage) containing 1.33 grams acetic acid and 1.97 grams of glacial acetic (0.055 mole total acetic acid) was prepared in a 100-ml. vessel equipped with a mechanical stirrer, thermometer and dropping funnel. While the mixture was being stirred vigorously, 7.45 grams (0.11 mole) of 50% hydrogen peroxide was added so that the temperature reached 60° C. in 15 minutes. The temperature was maintained at about 85° C. for two hours, first with intermittent cooling by ice water until the exothermic reaction subsided and then by warming in a water bath. At the end of this time the mixture was kept warm and the resin was removed by vacuum filtration. The filtrate containing the product was collected in 100 ml. of warm 1% NaCl solution. The oily product layer was separated and then washed with 100-ml. portions of hot water. After drying in a vacuum at 100° C. for one hour, followed by cooling, a light-colored solid with an iodine value of 4.8 and a hydroxyl value of 6.44% was obtained. Recrystallization of the product three times from hot cyclohexane yielded a white powder, melting point 67°–67.7° C. Analysis for methyl 9,10-dihydroxystearate was C—69.04%; H—11.40%. Calculated value: C—69.04%; H—11.59%.

Yields of methyl 9,10-dihydroxystearate of about 75% were obtained in accordance with the above method.

Example 2

A mixture of 29.2 grams (0.10 mole) of technical methyl oleate (iodine number 87.1), 8.1 grams of polystyrene sulfonic acid resin (4% cross-linkage) containing 0.8 gram of formic acid and 1.73 grams of glacial formic acid (0.055 mole total formic acid) was prepared in a 100-ml. vessel. This mixture was treated with 7.45 grams of 50% hydrogen peroxide and hydroxylation was carried out exactly as in Example 1. The product showed an iodine value of 1.2, an epoxy value of 0.44%, and a hydroxyl value of 7.6%.

Example 3

A mixture of 40 grams of alkali-refined soybean oil (iodine number 129.5), 11.8 grams of polystyrene sulfonic acid resin (4% cross-linkage) containing approximately 1.8 grams (18%) of glacial acetic acid and 6.0 grams of glacial acetic acid is prepared in a vessel equipped with a high speed stirrer, thermometer, and dropping funnel. While the mixture is being stirred vigorously, 15.2 grams of 50% hydrogen peroxide is added.

Hydroxylation is carried out at 60° C. for three hours. The product is isolated as in the previous examples and analyzes as follows: hydroxyl value, 9.6%; iodine value, 6.8; epoxy-oxygen value, 0.8%.

Example 4

The procedure of Example 1 is followed using the same reactants in three experiments in which only the temperature is varied. In the first experiment carried out at 40° C. the following values were obtained: hydroxyl value, 4.97%; iodine value, 2.8; epoxy-oxygen, 1.0%. In the second experiment conducted at 60° C. the following values were obtained: hydroxyl value, 6.4%; iodine value, 1.5; epoxy-oxygen, 0.7%. A third experiment was conducted at 90° C. for a short reaction period of one hour. The product had a hydroxyl value of 6.2%; iodine value of 9.3 and epoxy-oxygen value of 0.33%.

Example 5

Polyetherification of methyl oleate is effected by adjusting the procedure of Example 1 with respect to reaction time and temperature. Thus 29.2 grams of methyl oleate, 6.17 grams of 4% cross-linked polystyrene sulfonic acid resin (dry), 3.3 grams of glacial acetic acid, and 7.45 grams of 50% hydrogen peroxide are reacted at 90° C. for five hours. The product is a viscous, clear, brown liquid which is dissolved in hot cyclohexane and filtered. Cyclohexane is distilled off to deposit a material which eventually solidifies to a pasty mass (hydroxyl value, 3.7%; epoxy-oxygen, 0%). The infrared spectrum indicates the presence of an ether linkage (9.1 microns).

The one-step feature of the present method is obviously highly advantageous over the prior multi-step procedures for effecting hydroxylations. Advantage of the present method is that it can be operated continuously and at substantially higher temperatures than are generally practical with prior methods. Yet another advantage is the fact that the problem of recovering carboxylic acid is greatly minimized or may even be eliminated. The process is particularly valuable as commercially attractive means of upgrading natural fats and oils since there is a mounting surplus of animal fats and oils.

In the event a polyether product is desired, it is only necessary to carry out the reaction at a temperature of above 80° C. for five hours or more.

The embodiments of the invention in which an exclusive property or privilege is claimed are defined as follows:

1. The method of hydroxylating an olefinic compound selected from the group consisting of olefinic higher fatty acids and esters thereof comprising reacting said olefin, hydrogen peroxide and at least 0.01 mole of a lower aliphatic acid per mole of hydrogen peroxide in the presence of a cation exchange resin in its hydrogen form, said resin being the sulfonated copolymer of a monovinyl aromatic compound having about 1 to 6% of a polyvinyl aromatic hydrocarbon, said reaction being carried out at about 40° to 90° C.

2. The method of hydroxylating methyl ocetate comprising reacting methyl oleate, hydrogen peroxide and at least 0.01 mole of a lower aliphatic acid per mole of hydrogen peroxide in the presence of a cation exchange resin in its hydrogen form, said resin being the sulfonated copolymer of a monovinyl aromatic compound having about 1 to 6% of a polyvinyl aromatic hydrocarbon, said reaction being carried out at about 40° to 90° C.

3. The method of claim 2 wherein the reaction is carried out at about 60° to 80° C.

4. The method of hydroxylating an olefinic compound selected from the group consisting of olefinic higher fatty acids and esters thereof comprising reacting said olefin, hydrogen peroxide and about 0.2 to 1.0 mole of a lower aliphatic acid per mole of hydrogen peroxide in the presence of a cation exchange resin in its hydrogen form, said resin being a sulfonated copolymer of styrene and about 1 to 6% of divinyl benzene, said reaction being carried out at about 60° to 80° C.

5. The method of hydroxylating methyl oleate comprising reacting methyl oleate, hydrogen peroxide and about 0.2 to 1.0 mole of a lower aliphatic acid per mole of hydrogen peroxide in the presence of a cation exchange resin in its hydrogen form, said resin being a sulfonated copolymer of styrene and about 1 to 6% of divinyl benzene, said reaction being carried out at about 60° to 80° C.

6. The method of claim 5 wherein the resin contains about 4% divinyl benzene.

7. The method of claim 6 wherein the acid is acetic acid.

References Cited in the file of this patent
UNITED STATES PATENTS

| | | |
|---|---|---|
| 2,443,280 | Swern et al. | June 15, 1948 |
| 2,714,602 | Abbott | Aug. 2, 1955 |
| 2,801,253 | Greenspan et al. | July 30, 1957 |
| 2,919,283 | Greenspan et al. | Dec. 29, 1959 |

OTHER REFERENCES

Rohm & Haas: Chemical & Engineering News, page 557 (Feb. 21, 1949).

Kunin et al.: Ion Exchange Resins, 1952 edition, pp. 138–139, John Wiley & Sons, New York, N.Y.